(12) United States Patent
Mitsunobu et al.

(10) Patent No.: US 12,110,595 B2
(45) Date of Patent: Oct. 8, 2024

(54) HOT-DIP PLATED STEEL MATERIAL

(71) Applicant: NIPPON STEEL CORPORATION, Tokyo (JP)

(72) Inventors: Takuya Mitsunobu, Tokyo (JP); Kohei Tokuda, Tokyo (JP); Hiroshi Takebayashi, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 18/285,777

(22) PCT Filed: Mar. 31, 2023

(86) PCT No.: PCT/JP2023/013666
§ 371 (c)(1),
(2) Date: Oct. 5, 2023

(87) PCT Pub. No.: WO2023/203997
PCT Pub. Date: Oct. 26, 2023

(65) Prior Publication Data
US 2024/0093340 A1 Mar. 21, 2024

(30) Foreign Application Priority Data
Apr. 20, 2022 (JP) ................... 2022-069530

(51) Int. Cl.
*C23C 2/06* (2006.01)
*C23C 2/00* (2006.01)
*C23C 2/40* (2006.01)

(52) U.S. Cl.
CPC ............ *C23C 2/06* (2013.01); *C23C 2/40* (2013.01); *C23C 2/50* (2022.08)

(58) Field of Classification Search
CPC ........................................................ C23C 2/06
See application file for complete search history.

(56) References Cited

U.S. PATENT DOCUMENTS

2019/0390303 A1* 12/2019 Tokuda ............... C22C 38/00

FOREIGN PATENT DOCUMENTS

| AU | 2010267413 B2 | 5/2015 | |
|----|---------------|--------|---|
| JP | 2004-339530 A | 12/2004 | |
| JP | 2021-4403 A | 1/2021 | |
| JP | 2021-85086 A | 6/2021 | |
| JP | 2021-85089 A | 6/2021 | |
| JP | 2021-195600 A | 12/2021 | |
| WO | WO-2011001662 A1 * | 1/2011 | ............... C23C 2/06 |

OTHER PUBLICATIONS

WO 2011/001662 A1 English translation (Year: 2011).*
Written Opinion of the International Searching Authority for PCT/JP2023/013666 (PCT/ISA/237) mailed on May 30, 2023.

* cited by examiner

*Primary Examiner* — Hai Y Zhang
(74) *Attorney, Agent, or Firm* — Birch Stewart, Kolasch & Birch, LLP

(57) ABSTRACT

The hot-dip plated steel material includes a steel material and a hot-dip plated layer disposed on a surface of the steel material, the hot-dip plated layer has a certain chemical composition, and the hot-dip plated layer has a diffraction intensity obtained from a result of X-ray diffraction measurement, the diffraction intensity satisfying a certain relationship.

4 Claims, 1 Drawing Sheet

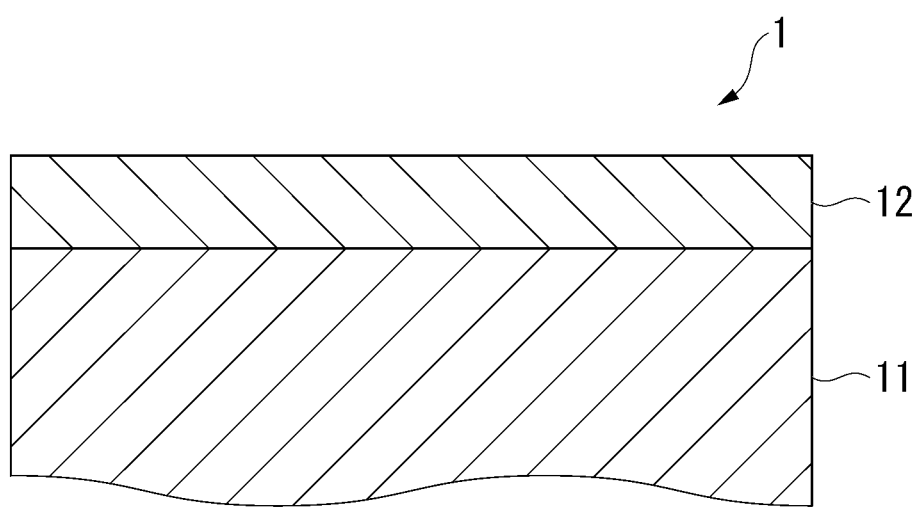

HOT-DIP PLATED STEEL MATERIAL

TECHNICAL FIELD OF THE INVENTION

The present invention relates to a hot-dip plated steel material.

The present application claims priority based on Japanese Patent Application No. 2022-069530 filed in Japan on Apr. 20, 2022, the contents of which are incorporated herein by reference.

RELATED ART

A steel material on the surface of which a hot-dip Zn-plated layer containing Al and Mg is formed (a hot-dip Zn—Al—Mg-based plated steel material) has excellent corrosion resistance. Therefore, hot-dip Zn—Al—Mg-based plated steel materials are widely used, for example, as a material for structural members required to have corrosion resistance, such as building materials.

For example, Patent Document 1 discloses a hot-dip plated steel sheet including: a steel sheet; and a hot-dip plated layer formed on a surface of the steel sheet, wherein the hot-dip plated layer contains Al: 0 to 90 mass % and Mg: 0 to 10 mass % in terms of average composition, and the remainder containing Zn and an impurity; and a pattern portion disposed so as to have a certain shape and a non-pattern portion are formed on the hot-dip plated layer, the pattern portion and the non-pattern portion each include one or two of a first region and a second region, the absolute value of the difference between the area ratio of the first region in the pattern portion and the area ratio of the first region in the non-pattern portion is 30% or more, and the first region has an orientation ratio of 3.5 or more and the second region has an orientation ratio of less than 3.5.

Patent Document 2 discloses a Zn—Al—Mg-based hot-dip plated steel sheet including: a steel sheet; and a hot-dip plated layer containing Al in an amount of 4 mass % or more and 22 mass % or less, Mg in an amount of 1 mass % or more and 5 mass % or less, and the remainder containing Zn and an unavoidable impurity, wherein the cross section of the hot-dip plated layer that is parallel to the surface of the hot-dip plated layer has a diffraction intensity ratio I(200)/I(111) of 0.8 or more, which is a ratio of X-ray diffraction intensity I(200) from the (200) plane of the Al phase to X-ray diffraction intensity I(111) from the (111) plane of the Al phase.

In recent years, hot-dip plated steel materials for building materials used for roofs, wall materials, and the like are required at a high level to have both planar corrosion resistance, which is the corrosion resistance of the plated layer itself, and sacrificial corrosion resistance for preventing corrosion of the base metal when the base metal is exposed. In the prior art, compatibility between planar corrosion resistance and sacrificial corrosion resistance has hardly been studied.

Patent Document 1 discloses that, when the first region means a region having an intensity ratio of 3.5 or more between (0002) plane diffraction peak intensity $I_{0002}$ and (10-11) plane diffraction peak intensity $I_{10\text{-}11}$ in the Zn phase and the second region means a region the intensity ratio of which is less than 3.5, the difference between the area ratio of the first region in the pattern portion and the area ratio of the first region in the non-pattern portion is set to be 30% or more to intentionally express characters, designs, and the like on the surface of the plated layer. However, Patent Document 1 has not studied on sacrificial corrosion resistance.

Patent Document 2 discloses that, by controlling the orientation of the Al phase in the plated layer, the plated layer has an appearance like a pear skin, which has fine texture and a lot of smooth glossy part. However, sacrificial corrosion resistance has not been examined.

CITATION LIST

Patent Document

[Patent Document 1]
Japanese Unexamined Patent Application, First Publication No. 2021-85086
[Patent Document 2]
PCT International Publication No. WO 2011/001662

SUMMARY OF INVENTION

Problems to be Solved by the Invention

The present invention has been made in view of the above circumstances, and an object of the present invention is to provide a hot-dip plated steel material that is more excellent in both planar corrosion resistance and sacrificial corrosion resistance.

Means for Solving the Problem

In order to solve the above problem, the present invention adopts the following configuration.

[1] A hot-dip plated steel material including:
a steel material; and
a hot-dip plated layer disposed on a surface of the steel material,
wherein the hot-dip plated layer has a chemical composition containing, in terms of mass %,
Al: 10.0 to 30.0%,
Mg: 3.0 to 15.0%,
Fe: 0.01 to 15.0%,
Si: 0 to 10.0%,
Ni: 0 to 1.0%, and
Ca: 0 to 4.0%, and
further containing one or two or more elements selected from the element group consisting of Sb: 0 to 0.5%, Pb: 0 to 0.5%, Cu: 0 to 1.0%, Sn: 0 to 2.0%, Ti: 0 to 1.0%, Cr: 0 to 1.0%, Nb: 0 to 1.0%, Zr: 0 to 1.0%, Mn: 0 to 1.0%, Mo: 0 to 1.0%, Ag: 0 to 1.0%, Li: 0 to 1.0%, La: 0 to 0.5%, Ce: 0 to 0.5%, B: 0 to 0.5%, Y: 0 to 0.5%, P: 0 to 0.5%, Sr: 0 to 0.5%, Co: 0 to 0.5%, Bi: 0 to 0.5%, In: 0 to 0.5%, V: 0 to 0.5%, and W: 0 to 0.5%, in an amount of 5% or less in total, and
the remainder: Zn and an impurity, and
the hot-dip plated layer has a diffraction intensity obtained from a result of X-ray diffraction measurement, the diffraction intensity satisfying a relationship of the following formulas (1a) and (2a):

$$0.5 \leq I(100)_{MgZn2} / \{I(002)_{MgZn2} + I(101)_{MgZn2}\} \leq 2.5 \quad (1a)$$

$$0.2 \leq I(111)_\alpha / I(200)_\alpha \leq 5.0 \quad (2a)$$

wherein, in the formula (1a), $I(100)_{MgZn2}$ represents an $MgZn_2$ phase (100) diffraction intensity, $I(002)_{MgZn2}$ represents an $MgZn_2$ phase (002) diffraction intensity, and $I(101)_{MgZn2}$ represents an $MgZn_2$ phase (101) diffraction intensity, and in the formula (2a), I(111), represents an α phase (111)diffraction intensity and I(200), represents an α phase (200)diffraction intensity.

[2] A hot-dip plated steel material including:
a steel material; and
a hot-dip plated layer disposed on a surface of the steel material,
wherein the hot-dip plated layer has a chemical composition containing, in terms of mass %,
Al: 15.0 to 30.0%,
Mg: 5.0 to 10.0%,
Fe: 0.01 to 15.0%,
Si: 0 to 10.0%,
Ni: 0 to 1.0%, and
Ca: 0 to 4.0%, and
further containing one or two or more elements selected from the element group consisting of Sb: 0 to 0.5%, Pb: 0 to 0.5%, Cu: 0 to 1.0%, Sn: 0 to 2.0%, Ti: 0 to 1.0%, Cr: 0 to 1.0%, Nb: 0 to 1.0%, Zr: 0 to 1.0%, Mn: 0 to 1.0%, Mo: 0 to 1.0%, Ag: 0 to 1.0%, Li: 0 to 1.0%, La: 0 to 0.5%, Ce: 0 to 0.5%, B: 0 to 0.5%, Y: 0 to 0.5%, P: 0 to 0.5%, Sr: 0 to 0.5%, Co: 0 to 0.5%, Bi: 0 to 0.5%, In: 0 to 0.5%, V: 0 to 0.5%, and W: 0 to 0.5%, in an amount of 5% or less in total, and
the remainder: Zn and an impurity, and
the hot-dip plated layer has a diffraction intensity obtained from a result of X-ray diffraction measurement, the diffraction intensity satisfying a relationship of the following formulas (1b) and (2b):

$$1.0 \leq I(100)_{MgZn2}/\{I(002)_{MgZn2}+I(101)_{MgZn2}\} \leq 2.0 \quad (1b)$$

$$0.2 \leq I(111)_\alpha/I(200)_\alpha \leq 5.0 \quad (2a)$$

wherein, in the formula (1b), $I(100)_{MgZn2}$ represents an $MgZn_2$ phase (100)diffraction intensity, $I(002)_{MgZn2}$ represents an $MgZn_2$ phase (002)diffraction intensity, and $I(101)_{MgZn2}$ represents an $MgZn_2$ phase (101)diffraction intensity, and in the formula (2b), I(111), represents an α phase (111)diffraction intensity and I(200), represents an α phase (200)diffraction intensity.

[3] The hot-dip plated steel material according to [1] or [2], wherein the chemical composition of the hot-dip plated layer contains Sn: 0.05 to 0.5% in terms of mass %, and
the hot-dip plated layer has a result of X-ray diffraction measurement that an $Mg_2Sn$ phase is detected.

Effects of the Invention

According to the above aspects of the present invention, it is possible to provide a hot-dip plated steel material that is more excellent in both planar corrosion resistance and sacrificial corrosion resistance.

BRIEF DESCRIPTION OF THE DRAWING

FIG. 1 is a schematic cross-sectional view of the hot-dip plated steel material according to an embodiment of the present invention.

EMBODIMENTS OF THE INVENTION

The sacrificial corrosion resistance of a plated layer is achieved by forming a plated layer containing an element (for example, Zn, Mg, and the like) having a higher ionization tendency than that of the base metal on the surface of a steel material and corroding the plated layer preferentially with respect to the base metal. Therefore, improvement in sacrificial corrosion resistance by a plated layer and improvement in planar corrosion resistance, which is the corrosion resistance of the plated layer itself, are not compatible.

Therefore, the present inventors have conducted intensive studies in order to improve both the planar corrosion resistance and sacrificial corrosion resistance of a hot-dip Zn-plated layer containing Al and Mg. The $MgZn_2$ phase and the α phase included in the plated layer each include various crystal orientation planes. All these crystal orientation planes do not have uniform corrosion resistance. For example, a crystal orientation plane that is a dense plane has relatively high corrosion resistance. On the other hand, a crystal orientation plane other than a dense plane has relatively low corrosion resistance.

Therefore, in order to achieve the above object, the present inventors have attempted to orient the crystal orientation of the $MgZn_2$ phase and the α phase contained in the plated layer in a random direction for each grain. In the surface of such a plated layer, crystal orientation planes having various orientations, which are different in corrosion resistance, are mixed. When such a plated layer is corroded, corrosion precedes on a crystal orientation plane having relatively low corrosion resistance. Then corrosion proceeds on a crystal orientation plane having relatively high corrosion resistance. As a result, corrosion proceeds in a well-balanced manner in the $MgZn_2$ phase and the α phase. Accordingly, Zn ions and Mg ions are continuously dissolving for a long period, thereby securing sacrificial corrosion resistance. In addition, it has been found that corrosion proceeds in a well-balanced manner in the $MgZn_2$ phase and the α phase so that a corrosion product is relatively uniformly generated on the surface of the plated layer and the α phase remains moderately to keep its barrier function, thereby improving planar corrosion resistance.

In addition, it has been found that, when the X-ray diffraction intensity obtained from the X-ray diffraction measurement result for the surface of the plated layer satisfies the relationship of the following formula (1a) and the following formula (2), the crystal orientation of the $MgZn_2$ phase and the α phase orients in a random direction for each grain, thereby successfully improving both planar corrosion resistance and sacrificial corrosion resistance. These findings led the present invention to be completed.

Hereinafter, the hot-dip plated steel material according to an embodiment of the present invention will be described. The hot-dip plated steel material according to the present embodiment includes: a steel material; and a hot-dip plated layer disposed on a surface of the steel material, wherein the hot-dip plated layer has a chemical composition containing, in terms of mass %, Al: 10.0 to 30.0%, Mg: 3.0 to 15.0%, Fe: 0.01 to 15.0%, Si: 0 to 10.0%, Ni: 0 to 1.0%, and Ca: 0 to 4.0%, and further containing one or two or more elements selected from the element group consisting of Sb: 0 to 0.5%, Pb: 0 to 0.5%, Cu: 0 to 1.0%, Sn: 0 to 2.0%, Ti: 0 to 1.0%, Cr: 0 to 1.0%, Nb: 0 to 1.0%, Zr: 0 to 1.0%, Mn: 0 to 1.0%, Mo: 0 to 1.0%, Ag: 0 to 1.0%, Li: 0 to 1.0%, La: 0 to 0.5%, Ce: 0 to 0.5%, B: 0 to 0.5%, Y: 0 to 0.5%, P: 0 to 0.5%, Sr: 0 to 0.5%, Co: 0 to 0.5%, Bi: 0 to 0.5%, In: 0 to 0.5%, V: 0 to 0.5%, and W: 0 to 0.5%, in an amount of 5% or less in total, and the remainder: Zn and an impurity, and the hot-dip plated layer has a diffraction intensity obtained from a result of X-ray diffraction measurement, the diffraction intensity satisfying a relationship of the following formulas (1a) and (2):

$$0.5 \leq I(100)_{MgZn2}/\{I(002)_{MgZn2}+I(101)_{MgZn2}\} \leq 2.5 \quad (1a)$$

$$0.2 \leq I(111)_\alpha/I(200)_\alpha \leq 5.0 \quad (2)$$

wherein, in the formula (1a), $I(100)_{MgZn2}$ represents an $MgZn_2$ phase (100)diffraction intensity, $I(002)_{MgZn2}$ represents an $MgZn_2$ phase (002)diffraction intensity, and $I(101)_{MgZn2}$ represents an $MgZn_2$ phase (101)diffraction intensity, and in the formula (2), I(111), represents an α phase (111)diffraction intensity and I(200), represents an α phase (200)diffraction intensity.

When the Al concentration and the Mg concentration in the chemical composition of the hot-dip plated layer are in the ranges of Al: 15.0 to 30.0% and Mg: 5.0 to 10.0%, respectively, it is preferable to satisfy the following formula (1b) together with the formula (2), instead of the formula (1a). When the Al concentration and the Mg concentration in the chemical composition of the hot-dip plated layer satisfy the ranges of Al: 15.0 to 30.0% and Mg: 5.0 to 10.0%, and satisfy the ranges of Al: 10.0 to 30.0% and Mg: 3.0 to 15.0%, respectively, it is only required to satisfy the formula (1a). When the Al concentration and the Mg concentration in the chemical composition of the hot-dip plated layer satisfy the ranges of Al: 15.0 to 30.0% and Mg: 5.0 to 10.0%, and satisfy the ranges of Al: 10.0 to 30.0% and Mg: 3.0 to 15.0%, respectively, it is preferable to satisfy the formula (1a) and additionally the following formula (1b).

$$1.0 \leq I(100)_{MgZn2}/\{I(002)_{MgZn2}+I(101)_{MgZn2}\} \leq 2.0 \quad (1b)$$

In the following description, the expression "%" of the content of each element in a chemical composition means "mass %". The content of an element in a chemical composition may be referred to as an element concentration (for example, Zn concentration, Mg concentration, and the like). The "planar section corrosion resistance" indicates a property that the hot-dip plated layer (specifically, Zn—Al—Mg alloy layer) itself is less likely to corrode. The "sacrificial corrosion resistance" indicates a property of suppressing steel material corrosion at a portion where steel material is exposed (for example, an end surface portion where the plated steel material is cut, a portion where the hot-dip plated layer is cracked due to processing, and a portion where steel material is exposed due to peeling of the hot-dip plated layer). The "hot-dip plated layer" means a plated film produced by the so-called hot-dip galvanizing.

As illustrated in FIG. 1, hot-dip plated steel material 1 according to the present embodiment includes steel material 11. The shape of steel material 11 is not particularly limited, and an example of steel material 11 is a steel sheet. In addition, steel material 11 may be, for example, a formed base steel material, such as a steel pipe, a civil engineering and construction material (fence culvert, corrugated pipe, drain channel lid, splash preventing plate, bolt, wire mesh, guard rail, water stop wall, and the like), a home electric appliance member (a housing of an outdoor unit of an air conditioner, or the like), and an automobile component (a suspension member, or the like). The forming is, for example, various plastic working methods, such as press working, roll forming, and bending.

The material of steel material 11 is not particularly limited. Steel material 11 may be, for example, various steel materials, such as general steel, Al-killed steel, ultra-low carbon steel, high carbon steel, various high tensile strength steels, and some high alloy steels (a steel containing a reinforcing element such as Ni, Cr, etc.). Steel material 11 may be a hot-rolled steel sheet, a hot-rolled steel strip, a cold-rolled steel sheet, a cold-rolled steel strip, and the like described in JIS G 3302: 2010. The method of manufacturing the steel sheet (hot rolling method, pickling method, cold rolling method, etc.), specific manufacturing conditions thereof, and the like are also not particularly limited.

As will be described later, as a steel material for an original sheet to be plated, a pre-plated steel material obtained by pre-plating the surface of steel material 11 is used. An example of the pre-plated steel material is an Ni pre-plated steel material obtained by Ni plating the surface of steel material 11. The pre-plated steel material is obtained by, for example, electrolytic treatment or displacement plating. The electrolytic treatment is performed by immersing a base steel material in a sulfuric acid bath or a chloride bath containing metal ions of various pre-plating components to perform an electrolytic treatment. The displacement plating is performed by immersing a base steel material in an aqueous solution containing metal ions of various pre-plating components and having a pH adjusted with sulfuric acid to substitute and deposit the metal.

Hot-dip plated steel material 1 according to the present embodiment includes hot-dip plated layer 12 disposed on the surface of steel material 11. Hot-dip plated layer 12 of hot-dip plated steel material 1 according to the present embodiment is mainly composed of a Zn—Al—Mg alloy layer due to the chemical composition described later. In addition, hot-dip plated layer 12 of hot-dip plated steel material 1 according to the present embodiment may include an interfacial alloy layer between steel material 11 and the Zn—Al—Mg alloy layer. That is, hot-dip plated layer 12 may have a single-layer structure of the Zn—Al—Mg alloy layer or a multi-layer structure including the Zn—Al—Mg alloy layer and the interfacial alloy layer. The interfacial alloy layer may contain an Al—Ni alloy phase. The Al—Ni alloy phase is derived from an Al—Ni compound formed by a reaction between Ni in Ni plating of the pre-plated steel material and Al in the hot-dip plating bath as described later. In the hot-dip plated steel material 1, the interfacial alloy layer containing the Al—Ni alloy phase may be formed on the entire interface between steel material 1 and the hot-dip plated layer 12. In addition, the interfacial alloy layer containing the Al—Ni alloy phase may be formed on a part of the interface, and the interfacial alloy layer containing an Fe—Al alloy phase may be formed on the other part.

The chemical composition of the hot-dip plated layer according to the present embodiment is composed of Zn and other alloy elements. The chemical composition of the hot-dip plated layer will be described in detail below. Note that the elements the concentration of which has a lower limit of 0% as described are not essential for solving the problem of the hot-dip plated steel material according to the present embodiment, but are optional elements that are allowed to be included in the hot-dip plated layer for the purpose of, for example, improving characteristics.

<Al: 10.0 to 30.0%>

Al forms an α-phase that is a solid solution with Zn, and contributes to improvement in planar section corrosion resistance, sacrificial corrosion resistance, and workability. Therefore, the Al concentration is 10.0% or more. The Al concentration may be 11.0% or more, 12.0% or more, or 15.0% or more. On the other hand, when Al is excessive, the Mg concentration and the Zn concentration relatively decrease, and sacrificial corrosion resistance is deteriorated. Therefore, the Al concentration is 30.0% or less. The Al concentration may be 28.0% or less, 25.0% or less, or 20.0% or less.

<Mg: 3.0 to 15.0%>

Mg is an element essential for securing planar section corrosion resistance and sacrificial corrosion resistance. Therefore, the Mg concentration is 3.0% or more. The Mg concentration may be 4.0% or more, 5.0% or more, or 6.0% or more. On the other hand, when the Mg concentration is excessive, workability, particularly powdering resistance, may be deteriorated, and planar section corrosion resistance may be further deteriorated. Therefore, the Mg concentration is 15.0% or less. The Mg concentration may be 12.0% or less, 10.0% or less, or 8.0% or less.

<Fe: 0.01% to 15.0%>

The Fe concentration may be 0%. On the other hand, Fe may be contained in the hot-dip plated layer in an amount of 0.01% or more. It has been confirmed that, when the Fe concentration is 15.0% or less, the performance of the hot-dip plated layer is not adversely affected. The Fe concentration may be, for example, 0.05% or more, 0.1% or more, 0.5% or more, or 1.0% or more. The Fe concentration may be, for example, 10.0% or less, 8.0% or less, or 6.0% or less. Since Fe may be mixed from the base steel sheet, the Fe concentration may be 0.05% or more.

<Si: 0% to 10.0%>

The Si concentration may be 0%. On the other hand, Si contributes to improvement in planar section corrosion resistance. Therefore, the Si concentration may be 0.05% or more, 0.1% or more, 0.2% or more, or 0.5% or more. On the other hand, when the Si concentration is excessive, planar section corrosion resistance and sacrificial corrosion resistance deteriorate. Therefore, the Si concentration is 10.0% or less. The Si concentration may be 8.0% or less, 7.0% or less, or 6.0% or less.

<Ni: 0 to 1.0%>

The Ni concentration may be 0%. On the other hand, Ni contributes to improvement in sacrificial corrosion resistance. Therefore, the Ni concentration may be 0.05% or more, 0.08% or more, or 0.1% or more. On the other hand, when the Ni concentration is excessive, planar section corrosion resistance is deteriorated. Therefore, the Ni concentration is 1.0% or less. The Ni concentration may be 0.8% or less, 0.6% or less, or 0.5% or less.

<Ca: 0% to 4.0%>

The Ca concentration may be 0%. On the other hand, Ca is an element capable of adjusting the optimum Mg elution amount for imparting planar section corrosion resistance. Therefore, the Ca concentration may be 0.05% or more, 0.1% or more, or 0.5% or more. On the other hand, when the Ca concentration is excessive, planar section corrosion resistance and workability are deteriorated. Therefore, the Ca concentration is 4.0% or less. The Ca concentration may be 3.5% or less, 3.0% or less, or 2.8% or less.

Furthermore, the hot-dip plated layer according to the present embodiment contains one or two or more elements selected from the element group consisting of Sb: 0 to 0.5%, Pb: 0 to 0.5%, Cu: 0 to 1.0%, Sn: 0 to 2.0%, Ti: 0 to 1.0%, Cr: 0 to 1.0%, Nb: 0 to 1.0%, Zr: 0 to 1.0%, Mn: 0 to 1.0%, Mo: 0 to 1.0%, Ag: 0 to 1.0%, Li: 0 to 1.0%, La: 0 to 0.5%, Ce: 0 to 0.5%, B: 0 to 0.5%, Y: 0 to 0.5%, P: 0 to 0.5%, Sr: 0 to 0.5%, Co: 0 to 0.5%, Bi: 0 to 0.5%, In: 0 to 0.5%, V: 0 to 0.5%, and W: 0 to 0.5%. The total of these elements is 5% or less. If the total exceeds 5%, planar corrosion resistance or sacrificial corrosion resistance may be reduced.

<Sb, Pb: 0 to 0.5% Each>

The concentration of Sb and Pb may be 0%. On the other hand, Sb and Pb contribute to improvement in sacrificial corrosion resistance. Therefore, the concentration of each of Sb and Pb may be 0.05% or more, 0.10% or more, or 0.15% or more. On the other hand, when the concentration of Sb and Pb are excessive, planar section corrosion resistance is deteriorated. Therefore, the concentration of each of Sb and Pb is 0.5% or less. The concentration of each of Sb and Pb may be 0.4% or less, 0.3% or less, or 0.25% or less.

<Cu, Ti, Cr, Nb, Zr, Mn, Mo, Ag and Li: 0 to 1.0% Each>

The concentration of each of Cu, Ti, Cr, Nb, Zr, Mn, Mo, Ag, and Li may be 0%. On the other hand, they contribute to improvement in sacrificial corrosion resistance. Therefore, the concentration of each of Cu, Ti, Cr, Nb, Zr, Mn, Mo, Ag, and Li may be 0.05% or more, 0.08% or more, or 0.10% or more. On the other hand, when the concentration of Cu, Ti, Cr, Nb, Zr, Mn, Mo, Ag, and Li are excessive, planar section corrosion resistance is deteriorated. Therefore, the concentration of each of Cu, Ti, Cr, Nb, Zr, Mn, Mo, Ag, and Li is 1.0% or less. The concentration of each of Cu, Ti, Cr, Nb, Zr, Mn, Mo, Ag, and Li may be 0.8% or less, 0.7% or less, or 0.6% or less.

<Sn: 0 to 2.0%>

The Sn concentration may be 0%. On the other hand, Sn is an element that forms an intermetallic compound with Mg and improves the sacrificial corrosion resistance of the hot-dip plated layer. Therefore, the Sn concentration may be 0.05% or more, 0.1% or more, or 0.2% or more. However, when the Sn concentration is excessive, planar corrosion resistance is deteriorated. Therefore, the Sn concentration is 2.0% or less. The Sn concentration may be 1.5% or less, 1.0% or less, 0.6% or less, or 0.5% or less.

<La, Ce, B, Y, P, and Sr: 0 to 0.5% Each>

The concentration of each of La, Ce, B, Y, P, and Sr may be 0%. On the other hand, La, Ce, B, Y, P, and Sr contribute to improvement in sacrificial corrosion resistance. Therefore, the concentration of each of La, Ce, B, Y, P, and Sr may be 0.10% or more, 0.15% or more, or 0.20% or more. On the other hand, when the concentration of each of La, Ce, B, Y, P, and Sr are excessive, planar section corrosion resistance deteriorates. Therefore, the concentration of each of La, Ce, B, Y, P, and Sr is 0.5% or less. The concentration of each of La, Ce, B, Y, P, and Sr may be 0.4% or less or 0.3% or less.

<Co, Bi, In, V, and W: 0 to 0.5% Each>

The concentration of each of Co, Bi, In, V, and W may be 0%. On the other hand, Co, Bi, In, V, and W contribute to improvement in sacrificial corrosion resistance. Therefore, the concentration of each of Co, Bi, In, V, and W may be 0.10% or more, 0.15% or more, or 0.20% or more. On the other hand, when the concentration of each of Co, Bi, In, V, and W is excessive, planar section corrosion resistance is deteriorated. Therefore, the concentration of each of Co, Bi, In, V, and W is 0.5% or less. The concentration of each of Co, Bi, In, V, and W may be 0.4% or less or 0.3% or less.

<Remainder: Zn and Impurity>

The remainder of the components of the hot-dip plated layer according to the present embodiment is Zn and an impurity. Zn is an element that brings planar section corrosion resistance and sacrificial corrosion resistance to the hot-dip plated layer. The impurity refers to a component that is contained in a raw material or mixed in a manufacturing process and not intentionally contained. For example, in the hot-dip plated layer, a small amount of components other than Fe may be mixed as the impurity due to mutual atomic diffusion between the base steel material and the plating bath.

The chemical composition of the hot-dip plated layer is measured by the following method. First, an acid solution in which the hot-dip plated layer is peeled off and dissolved is obtained using an acid containing an inhibitor that suppresses steel material corrosion. Next, the obtained acid solution is subjected to inductively coupled plasma (ICP) analysis. Thereby, the chemical composition of the hot-dip plated layer can be determined. The acid species is not particularly limited as long as it is an acid capable of dissolving the hot-dip plated layer. The chemical composition measured by the above-described means is an average chemical composition of the entire hot-dip plated layer.

Next, the metallographic structure of the hot-dip plated layer will be described.

The metallographic structure of the hot-dip plated layer contains an α phase and an $MgZn_2$ phase. The α phase and the $MgZn_2$ phase improve the planar section corrosion resistance of the hot-dip plated layer. In addition, as will be described later, the sacrificial corrosion resistance of the hot-dip plated steel material is improved by randomly orienting each of the α phase and the $MgZn_2$ phase.

The area ratio of the α phase in the hot-dip plated layer is preferably 15 to 80%. The area ratio of the $MgZn_2$ phase is preferably 5 to 55%. The total area ratio of the α phase and the $MgZn_2$ phase is preferably 20% or more and 100% or less. However, the area ratio range is an example, and the area fraction of the hot-dip plated layer structure according to the present invention is not limited to this range. The hot-dip plated layer is only required to satisfy at least one of the formulae (1a) and (1b) described below; and the formula (2).

In addition, when 0.05 to 0.5% of Sn is contained in the hot-dip plated layer, the $Mg_2Sn$ phase is reliably contained in the hot-dip plated layer. Since the amount of the $Mg_2Sn$ phase is small, the presence thereof is confirmed by X-ray diffraction measurement. When the hot-dip plated layer contains the $Mg_2Sn$ phase therein, the hot-dip plated steel material has more improved sacrificial corrosion resistance.

The hot-dip plated layer may contain a phase other than the α phase and the $MgZn_2$ phase as the remainder. For example, the hot-dip plated layer having the above-described chemical composition may include an q-Zn phase, an Al—Ca—Si phase, and the like. When the α phase and the $MgZn_2$ phase are contained in an amount within the above ranges, planar section corrosion resistance and sacrificial corrosion resistance can be secured. Therefore, the configuration of phases or structures other than the α phase and the $MgZn_2$ phase is not particularly limited.

Next, the crystal orientation of the α phase and the $MgZn_2$ phase will be described.

In the hot-dip plated layer of the present embodiment, when the X-ray diffraction intensity obtained from the X-ray diffraction measurement result of the hot-dip plated layer satisfies the relationship of the following formulas (1a) and (2), the crystal orientation of the $MgZn_2$ phase and the α phase are oriented in random directions for each grain, thereby improving both sacrificial corrosion resistance and planar corrosion resistance.

$$0.5 \leq I(100)_{MgZn2}/\{I(002)_{MgZn2}+I(101)_{MgZn2}\} \leq 2.5 \quad (1a)$$

$$0.2 \leq I(111)_\alpha/I(200)_\alpha \leq 5.0 \quad (2)$$

When the Al concentration and the Mg concentration in the chemical composition of the hot-dip plated layer are in the ranges of Al: 15.0 to 30.0% and Mg: 5.0 to 10.0%, respectively, it is preferable to satisfy the following formula (1b) together with the formula (2), instead of the formula (1a). When the Al concentration and the Mg concentration in the chemical composition of the hot-dip plated layer satisfy the ranges of Al: 15.0 to 30.0% and Mg: 5.0 to 10.0%, and satisfy the ranges of Al: 10.0 to 30.0% and Mg: 3.0 to 15.0%, respectively, it is only required to satisfy the formula (1a). When the Al concentration and the Mg concentration in the chemical composition of the hot-dip plated layer satisfy the ranges of Al: 15.0 to 30.0% and Mg: 5.0 to 10.0%, and satisfy the ranges of Al: 10.0 to 30.0% and Mg: 3.0 to 15.0%, respectively, it is preferable to satisfy the formula (1a) and additionally the following formula (1b).

$$1.0 \leq I(100)_{MgZn2}/\{I(002)_{MgZn2}+I(101)_{MgZn2}\} \leq 2.0 \quad (1b)$$

In the formula (1a) and the formula (1b), $I(100)_{MgZn2}$ represents an $MgZn_2$ phase (100)diffraction intensity, $I(002)_{MgZn2}$ represents an $MgZn_2$ phase (002)diffraction intensity, and $I(101)_{MgZn2}$ represents an $MgZn_2$ phase (101) diffraction intensity. In the formula (2), I(111), represents an α phase (111)diffraction intensity and $I(200)_\alpha$ represents an α phase (200)diffraction intensity.

As shown in the formula (1a), when $I(100)_{MgZn2}/\{I(002)_{MgZn2}+I(10)_{MgZn2}\}$ is in the range of 0.5 to 2.5, the crystal orientation of the $MgZn_2$ phase is oriented in a random direction for each grain. It is preferable to have the range of 1.0 to 2.0 as shown in the formula (1b) when the Al concentration is 15.00 to 30.00% and the Mg concentration is 5.00 to 10.00%. Furthermore, when $I(100)_{MgZn2}/\{I(002)_{MgZn2}+I(101)_{MgZn2}\}$ is 1.06, the $MgZn_2$ phase is oriented most randomly. Thus $I(100)_{MgZn2}/\{I(002)_{MgZn2}+I(101)_{MgZn2}\}$ is more preferably in the range of 1.0 to 1.2.

When $I(111)_\alpha/I(200)$, in the formula (2) is in the range of 0.2 to 5.0, the crystal orientation of the α phase is oriented in a random direction for each grain. When $I(111)_\alpha/I(200)_\alpha$ is 2.1, the α phase is oriented most randomly. Thus, $I(111)_\alpha/I(200)_\alpha$ is more preferably in the range of 2.0 to 2.2.

The method for measuring the area fraction of the $MgZn_2$ phase is as follows. The surface of the hot-dip plated layer of a sample cut into 30 mm×30 mm is adjusted to be flat by mechanical polishing (for example, polishing with emery paper #2000). Next, the surface of the plated layer is chemically polished by colloidal polishing, and the polishing is continued until the surface becomes a mirror surface state. The surface of the plated layer after polishing is observed with a scanning electron microscope (SEM). Specifically, an element distribution image is captured using scanning electron microscope-energy dispersive spectroscopy (SEM-EDS) at a magnification of 5000 times. In this element distribution image, a phase in which Mg and Zn coexist is specified as the $MgZn_2$ phase. In the present specification, a region of Mg: 20 to 40 at % and Zn: 50 to 80 at % is determined as a phase ($MgZn_2$ phase) in which Mg and Zn coexist. After the $MgZn_2$ phase is identified, the area fraction of the α phase and the $MgZn_2$ phase included in the field of view is calculated through binarization using image analysis software.

The method for measuring the area fraction of the α phase is as follows. The surface of the hot-dip plated layer of a sample cut into 30 mm×30 mm is adjusted to be flat by mechanical polishing. Next, the surface of the plated layer is chemically polished by colloidal polishing, and the polishing is continued until the surface becomes a mirror surface state. The surface of the plated layer after polishing is observed by SEM. Specifically, an element distribution image is captured using SEM-EDS at a magnification of 5000 times. In this element distribution image, a phase in which Al and Zn coexist is specified as the α phase. In the present specification, a region of Al: 40 to 95 at % and Zn: 0.5 to 50 at % is determined as a phase (a phase) in which Al and Zn coexist. After the α phase is identified, the area fraction of the α phase contained in the field of view is calculated through binarization using image analysis software.

The method for measuring $I(100)_{MgZn2}/\{(002)_{MgZn2}+I(101)_{MgZn2}\}$ in the formula (1a) and the formula (1b) is as follows. First, the surface of the hot-dip plated layer is mirror-polished and chemically polished as necessary. Next, for example, X-ray diffraction measurement is performed using an X-ray diffractometer (manufactured by Rigaku Corporation (model number RINT-TTR III) under the conditions of X-ray output: 50 kV and 300 mA; copper target; goniometer TTR (horizontal goniometer); slit width of KP filter: 0.05 mm; longitudinal limiting slit width: 2 mm; light receiving slit width: 8 mm; and light receiving slit 2: open, and under the measurement conditions of scan speed: 5 deg./min; step width: 0.01 deg; and scan axis: 2θ (5 to 90°). Then, for the $MgZn_2$ phase, the diffraction intensity (maximum intensity in the range of 19.67±0.2°) from the (100) plane, the diffraction intensity (maximum intensity in the range of 20.78±0.2°) from the (002) plane, and the diffraction intensity (maximum intensity in the range of 20.78±0.2°) from the (101) plane are measured, respectively. The diffraction intensity is an intensity excluding the background intensity. From the obtained diffraction intensity, $I(100)_{MgZn2}/\{I(002)_{MgZn2}+I(101)_{MgZn2}\}$ is determined.

The method for measuring $I(111)\alpha/I(200)\alpha$ in the formula (2) is as follows. First, the surface of the hot-dip plated layer is mirror-polished and chemically polished as necessary. Next, for example, X-ray diffraction measurement is performed using the same X-ray diffractometer and measurement conditions as described above. Then, for the α phase, the diffraction intensity (maximum intensity in the range of 38.47±0.2°) from the (111) plane and the diffraction intensity (maximum intensity in the range of 44.74±0.2°) from the (200) plane are measured, respectively. The diffraction intensity is an intensity excluding the background intensity. From the obtained diffraction intensity, $I(111)_\alpha/I(200)_\alpha$ is obtained.

Whether or not the $Mg_2Sn$ phase is contained in the hot-dip plated layer is determined by whether or not a diffraction peak specific to $Mg_2Sn$ appears when the X-ray diffraction measurement is performed.

The adhesion amount per one surface of the hot-dip plated layer may be, for example, within a range of 20 to 150 g/m². When the adhesion amount per one surface is 20 g/m² or more, planar corrosion resistance and sacrificial corrosion resistance of the hot-dip plated steel material can be further enhanced. On the other hand, when the adhesion amount per one surface is 150 g/m² or less, the workability of the hot-dip plated steel material can be further improved.

Next, the method for producing a hot-dip plated steel material according to the present embodiment will be described, but the method for producing a hot-dip plated steel material according to the present embodiment is not particularly limited. For example, according to the manufacturing conditions described below, the hot-dip plated steel material according to the present embodiment can be obtained.

In the method for producing a hot-dip plated steel material of the present embodiment, an Ni pre-plated steel material obtained by subjecting steel material 11 to Ni pre-plating is used as an original sheet to be plated. The surface of steel material 11 is subjected to a process of applying strain before Ni pre-plating. Next, the Ni pre-plated steel material is annealed in a reducing atmosphere, and the Ni pre-plated steel material immediately after the annealing is immersed in a hot-dip plating bath and then pulled up to form a hot-dip plated layer on the surface of the steel material. Next, mist cooling is performed until the temperature of the hot-dip plated layer reaches 300° C. or lower from the bath temperature.

Initially, the method for preparing the original sheet to be plated will be described. First, a process of applying strain to the surface of steel material 11 is performed. Specifically, the surface of steel material 11 is subjected to a grinding treatment or a polishing treatment. The grinding amount in the grinding process is not particularly limited, but may be, for example, at least 0.1 mm or more. On the other hand, the polishing treatment is to polish the surface of the steel material with a metal brush (grinding brush) when alkali cleaning is performed in order to remove dirt and oil adhering to the surface of steel material 11, for example. As a result, a large number of sliding defects are formed on the surface of the steel material to apply strain. In the grinding, the rolling reduction of the grinding brush is 0.5 to 10.0 mm. When the rolling reduction of the grinding brush is less than 0.5 mm, sufficient strain cannot be imparted, failing to randomly orient the α phase and the $MgZn_2$ phase in the step of solidifying the hot-dip plating described later. In addition, it is preferable to apply a 1.0 to 5.0% NaOH aqueous solution to the surface of the steel sheet when grinding the surface of the steel material. As a result, dirt and oil adhering to the surface of steel material 11 are sufficiently removed. In order to apply sufficient strain to the steel sheet, the rolling reduction of the grinding brush used for grinding is 0.5 to 10.0 mm. The rotation speed of the grinding brush is preferably 100 to 1000 rpm. Next, Ni plating is performed on the surface of steel material 11. The adhesion amount of Ni plating is, for example, 0.05 to 5.0 mg/m². In this way, the Ni pre-plated steel material is prepared.

Next, the Ni pre-plated steel material is annealed in a reducing atmosphere. For the annealing condition, the soaking temperature is lower than 600° C. When the soaking temperature is 600° C. or higher, Ni and Fe are alloyed so that formation of an Al—Ni compound does not proceed, the number of nucleation sites decreases, and the α phase and the $MgZn_2$ phase are not randomly oriented. The lower limit of the soaking temperature is not particularly limited, but may be, for example, 500° C. or higher. The soaking temperature is preferably 550° C. or higher. The soaking time is not particularly limited, but for example, the soaking time may be 0 to 2 minutes. The annealing atmosphere is not particularly limited as long as it is a reducing atmosphere. For example, a mixed atmosphere of hydrogen and nitrogen may be used.

The steel material immediately after annealing is immersed in a hot-dip plating bath. The chemical composition of the hot-dip plating bath may be appropriately adjusted so as to obtain the chemical composition of the hot-dip plated layer described above. The temperature of the hot-dip plating bath is also not particularly limited. It is possible to appropriately select a temperature at which hot-dip plating can be performed. For example, the plating bath temperature may be higher than the melting point of the plating bath by about 20° C. or more.

Next, the steel material to which the molten metal adheres is pulled up from the hot-dip plating bath. The adhesion amount of the hot-dip plated layer can be controlled by controlling the pulling speed of the steel material. If necessary, wiping may be performed on the steel material to which the hot-dip plated layer is adhered to control the adhesion amount of the hot-dip plated layer. The adhesion amount of the hot-dip plated layer is not particularly limited, and can be, for example, within the above-described range.

Next, the hot-dip plated layer is cooled. In the cooling, mist cooling is performed on the steel material immediately after being pulled up from the hot-dip plating bath. The mist cooling is continuously performed until the temperature of the hot-dip plated layer reaches 300° C. from the bath temperature. The cooling condition at less than 300° C. is not particularly limited. Mist cooling may be subsequently performed, or air cooling or natural cooling may be performed.

The mist cooling is performed by injecting atomized water onto the surface of the hot-dip plated layer. By spraying atomized water onto the surface of the plated layer, vibration is applied to the hot-dip plated layer. The mist-spraying amount is, for example, 1.0 to 30 [L/(mm$^2$·min)], and the spray time is 1 to 60 seconds.

When the mist-spraying amount is less than 1.0 [L/(mm$^2$·min)], the steel material is not given sufficient vibration, making it difficult to randomly orient the α phase and the MgZn$_2$ phase during solidification of the hot-dip plated layer. When the mist-spraying amount exceeds 30 [L/(mm$^2$·min)], the surface of the plated layer is excessively oxidized, which causes poor appearance.

When the spray time is less than one second, the steel material is not given sufficient vibration, making it difficult to randomly orient the α phase and the MgZn$_2$ phase during solidification of the hot-dip plated layer. The upper limit of the spray time is not limited, but is 60 seconds or less because the effect of mist spraying is saturated when the spray time exceeds 60 seconds.

By cooling the hot-dip plated layer so as to satisfy the above conditions, the hot-dip plated layer satisfying: at least one of the above formulas (1a) and (1b); and the formula (2) can be formed. The reason is presumed as follows.

In the above manufacturing method, an Ni pre-plated steel material in which strain is applied to the surface of the steel material in advance is used as the original sheet to be plated. When such an Ni pre-plated steel material is hot-dip plated, Ni in the Ni pre-plated steel material and Al in the hot-dip plating bath react with each other to form an Al—Ni compound on the surface of the steel material. In addition, more Al—Ni compounds are formed by the strain applied to the surface of the steel material. The Al—Ni compound serves as a nucleation site during solidification of the plated layer. Further, when the steel material is vibrated by mist cooling after hot dip plating, nucleation sites further increase in number. It is presumed that, since a large number of nucleation sites are formed in this manner, the α phase and the MgZn$_2$ phase are randomly oriented during solidification of the hot-dip plated layer.

EXAMPLES

Hereinafter, embodiments of the present invention will be described. However, the conditions in Examples are merely one condition example adopted to confirm the operability and effects of the present invention. The present invention is not limited to this one condition example. The present invention can adopt various conditions as long as the object of the present invention is achieved without departing from the gist of the present invention.

Grinding was performed under the conditions shown in Table 1, using D-100, a grinding brush manufactured by HOTANI Co., Ltd. When grinding is performed, a 1.0 to 5.0% aqueous NaOH solution was applied to the surface of the steel sheet. In the column of the strain treatment conditions in Table 1, "AA" means that the brush rolling reduction is 10 mm, "A" means that the brush rolling reduction is 0.5 mm, and "B" means that the brush rolling reduction is 0.4 mm. The grinding was performed at a rotation speed of 100 to 1000 rpm.

After annealing, the strained Ni pre-plated steel material was immersed in various hot-dip plating baths and pulled up to adhere a hot-dip plated layer to the surface of the steel material. Then the hot-dip plated layer was cooled by mist cooling from immediately after the pulling up from the hot-dip plating bath and until the temperature of the hot-dip plated layer reached 300° C. Thereby various hot-dip plated steel materials were produced. The mist-spraying amount was 0.7 to 32 [L/(mm$^2$·min)], and the spray time was 5 seconds.

As the Ni pre-plated steel material, one obtained by Ni plating the surface of the steel material was used. The adhesion amount of Ni plating was 0.8 mg/m$^2$. In addition, the steel material before Ni plating was formed was subjected to alkali cleaning in order to remove dirt and oil adhered to the surface of the steel material. At that time, the surface of the steel material was polished with a metal brush to form a large number of sliding defects, thereby imparting strain to the surface of the steel material.

Further, the strained Ni pre-plated steel material was annealed in a reducing atmosphere. For the annealing conditions, the soaking temperature was 580 to 800° C. and the soaking time was 10 seconds. The annealing atmosphere was a reducing atmosphere composed of a mixed gas of hydrogen and nitrogen. The steel material immediately after annealing was immersed in a hot-dip plating bath.

The chemical composition of the hot-dip plated layer was as shown in Table 1. In Table 1, the remainder is Zn and an impurity. The components of the Ni pre-plating are included in the chemical components of the hot-dip plated layer described in Table 1. The production conditions were as shown in Table 2. The metallographic structure of the plated layer was evaluated, and the results are shown in Table 3. Furthermore, the surface corrosion resistance and sacrificial corrosion resistance of the hot-dip plated steel material were evaluated, and the results are shown in Table 3.

The chemical composition of the hot-dip plated layer and the metallographic structure of the hot-dip plated layer were evaluated by the means described above.

The planar corrosion resistance was evaluated as follows. The obtained hot-dip plated steel material was cut into 100 mm×50 mm and subjected to an evaluation test of planar corrosion resistance. The planar corrosion resistance was evaluated by the corrosion acceleration test specified in JASO-CCT-M609. After 120 cycles, the corrosion loss was compared. The evaluation criteria were as follows, and "AA" and "A" were regarded as acceptable.

AA: corrosion loss of less than 40 g/m$^2$
A: corrosion loss of 40 g/m$^2$ or more and less than 60 g/m$^2$
B: 60 g/m$^2$ or more The sacrificial corrosion resistance was evaluated as follows. A rectangular test piece of 70×150 mm was cut out from the obtained hot-dip plated steel material, the JASO test (M609-91) was performed with the four end surfaces of the test piece kept open, and the red rust area ratio of the left and right side surface portions at the end surface portion after 30 cycles was evaluated. The evaluation criteria of the red rust area ratio are shown below. "AA" and "A" were regarded as acceptable.

AA: Red rust area ratio of less than 10%
A: Red rust area ratio of 10% or more and less than 20%
B: Red rust area ratio of 20% or more Examples 1 to 25 and 39 to 41 according to the present invention, in which the chemical composition and the metallographic structure of the hot-dip plated layer were appropriately controlled, were excellent in both planar corrosion resistance and sacrificial corrosion resistance. In Examples, the adhesion amount per one surface of the hot-dip plated layer was, for example, within a range of 20 to 150 g/m$^2$.

Comparative Example 26 had an insufficient Al amount in its hot-dip plated layer. Therefore, Comparative Example 26 had an insufficient planar corrosion resistance.

Comparative Example 27 had an excessive Al amount in its hot-dip plated layer. Therefore, Comparative Example 27 had an insufficient sacrificial corrosion resistance.

Comparative Example 28 had an insufficient Mg amount in its hot-dip plated layer. Therefore, Comparative Example 28 was insufficient in both planar corrosion resistance and sacrificial corrosion resistance.

Comparative Example 29 had an excessive Mg amount in its hot-dip plated layer. Therefore, Comparative Example 29 had an insufficient planar corrosion resistance.

Comparative Example 30 had an excessive Si amount in its hot-dip plated layer. Therefore, Comparative Example 30 was insufficient in both planar corrosion resistance and sacrificial corrosion resistance.

Comparative Example 31 had an excessive Ca amount in its hot-dip plated layer. Therefore, Comparative Example 31 was insufficient in both planar corrosion resistance and sacrificial corrosion resistance.

Comparative Example 32 had an excessive Ni amount in its hot-dip plated layer. Therefore, Comparative Example 32 was insufficient in both planar corrosion resistance and sacrificial corrosion resistance.

Comparative Example 33 performed air cooling with an inert gas without performing mist cooling. Therefore, the α phase and the $MgZn_2$ phase were not randomly oriented in Comparative Example 33. Therefore, Comparative Example 33 was insufficient in both planar corrosion resistance and sacrificial corrosion resistance.

Comparative Example 34 did not Ni plate the steel material. Therefore, the α phase and the $MgZn_2$ phase were not randomly oriented in Comparative Example 34. Therefore, Comparative Example 34 was insufficient in both planar corrosion resistance and sacrificial corrosion resistance.

Comparative Example 35 had a mist-spraying amount of less than 1.0 [L/(mm²·min)] in mist cooling. Therefore, the α phase and the $MgZn_2$ phase were not randomly oriented in Comparative Example 35. Therefore, Comparative Example 33 was insufficient in both planar corrosion resistance and sacrificial corrosion resistance.

Comparative Example 36 had a mist-spraying amount of more than 30 [L/(mm²·min)] in mist cooling. Therefore, Comparative Example 36 had a poor plating appearance. Therefore, in Comparative Example 36, neither the plated layer microstructure nor planar corrosion resistance and sacrificial corrosion resistance were evaluated.

Comparative Examples 37, 38, and 42 had a soaking temperature of 600° C. or higher at the time of annealing. Therefore, in Comparative Examples 37, 38, and 42, Ni and Fe were alloyed, the function as a nucleation site for Ni plating was lost, and the α phase and the $MgZn_2$ phase were not randomly oriented. Therefore, Comparative Examples 37, 38, and 42 were insufficient in both planar corrosion resistance and sacrificial corrosion resistance.

Comparative Example 43, having less rolling reduction at the time of grinding, failed to apply sufficient strain. Therefore, the α phase and the $MgZn_2$ phase were not randomly oriented. Therefore, Comparative Example 43 was insufficient in both planar corrosion resistance and sacrificial corrosion resistance.

TABLE 1

| | | Plated layer components (mass %) | | | | | | | | Other elements | |
|---|---|---|---|---|---|---|---|---|---|---|---|
| Classification | No. | Zn | Al | Mg | Sn | Si | Ca | Ni | Fe | Type | Total (%) |
| Example | 1 | Remainder | 10 | 3 | 0 | 0.05 | 0.1 | 0.2 | 0.1 | — | — |
| Example | 2 | Remainder | 11 | 3 | 0.08 | 0.2 | 0 | 0.2 | 0.05 | Co | 0.01 |
| Example | 3 | Remainder | 10 | 5 | 0.08 | 0.2 | 0.2 | 0.1 | 0.1 | Bi | 0.005 |
| Example | 4 | Remainder | 12 | 5 | 0 | 0.2 | 0 | 0.1 | 0.1 | — | — |
| Example | 5 | Remainder | 14 | 6 | 0.08 | 0.2 | 0.2 | 0.2 | 0.08 | Sb | 0.08 |
| Example | 6 | Remainder | 14 | 3 | 0 | 0 | 0 | 0.2 | 0.1 | Li | 0.01 |
| Example | 7 | Remainder | 18 | 3 | 0.1 | 0.2 | 0 | 0.1 | 0.2 | Ag | 0.02 |
| Example | 8 | Remainder | 19 | 5 | 0.1 | 0.2 | 0.1 | 0.2 | 0.3 | P | 0.001 |
| Example | 9 | Remainder | 19 | 6 | 0.1 | 0.2 | 0.1 | 0.2 | 0.2 | Mn | 0.10 |
| Example | 10 | Remainder | 19 | 6 | 2.0 | 0 | 0 | 0.2 | 0.1 | Sr | 0.05 |
| Example | 11 | Remainder | 19 | 6 | 0.01 | 0.2 | 0.2 | 0.1 | 0.1 | — | — |
| Example | 12 | Remainder | 19 | 6 | 0.05 | 0.2 | 0.2 | 0.2 | 0.1 | Pb | 0.03 |
| Example | 13 | Remainder | 19 | 7.5 | 0 | 0.2 | 0.2 | 0.2 | 0.1 | In | 0.01 |
| Example | 14 | Remainder | 19 | 15 | 0.15 | 0.2 | 3 | 0.1 | 0.1 | V | 0.01 |
| Example | 15 | Remainder | 20 | 5 | 0.05 | 0.2 | 0.3 | 0.2 | 0.1 | B | 0.01 |
| Example | 16 | Remainder | 20 | 3 | 0.1 | 0.8 | 0.3 | 0.2 | 1.3 | Nb | 0.02 |
| Example | 17 | Remainder | 20 | 6 | 0 | 0.2 | 0.2 | 0.2 | 0.1 | La | 0.02 |
| Example | 18 | Remainder | 20 | 8 | 0 | 0.1 | 0.2 | 0.2 | 0.2 | Ce | 0.01 |
| Example | 19 | Remainder | 22 | 3 | 0.1 | 0.1 | 0.3 | 0.1 | 0.2 | Zr | 0.02 |
| Example | 20 | Remainder | 24 | 3 | 0.1 | 0.2 | 0.2 | 0.2 | 0.3 | W | 0.01 |
| Example | 21 | Remainder | 22 | 4 | 0 | 0.1 | 0.3 | 0.2 | 0.4 | Mo | 0.02 |
| Example | 22 | Remainder | 22 | 8 | 0.1 | 0.2 | 0.3 | 0.2 | 0.5 | Ti | 0.01 |
| Example | 23 | Remainder | 24 | 5 | 0.1 | 0.6 | 0.3 | 0.3 | 0.9 | Cu | 0.2 |
| Example | 24 | Remainder | 28 | 8 | 0.1 | 1.3 | 0.3 | 0.2 | 1.4 | Y | 0.02 |
| Example | 25 | Remainder | 30 | 10 | 0.1 | 2 | 0.3 | 0.2 | 1.3 | Cr | 0.05 |
| Comparative Example | 26 | Remainder | 7 | 3 | 0 | 0.05 | 0.1 | 0.2 | 0.1 | — | — |
| Comparative Example | 27 | Remainder | 33 | 6 | 0 | 0 | 0 | 0.2 | 0.1 | — | — |
| Comparative Example | 28 | Remainder | 19 | 2 | 0 | 0.2 | 0.2 | 0.2 | 0.1 | — | — |

TABLE 1-continued

| | | Plated layer components (mass %) | | | | | | | | Other elements | |
|---|---|---|---|---|---|---|---|---|---|---|---|
| Classification | No. | Zn | Al | Mg | Sn | Si | Ca | Ni | Fe | Type | Total (%) |
| Comparative Example | 29 | Remainder | 19 | 16.5 | 0 | 0 | 0.2 | 0.2 | 0.1 | — | — |
| Comparative Example | 30 | Remainder | 19 | 5 | 0 | 10.4 | 0.2 | 0.2 | 0.1 | — | — |
| Comparative Example | 31 | Remainder | 19 | 5 | 0 | 0 | 4.1 | 0.1 | 0.1 | — | — |
| Comparative Example | 32 | Remainder | 20 | 5 | 0 | 0.2 | 0.3 | 2.1 | 0.1 | — | — |
| Comparative Example | 33 | Remainder | 22 | 5 | 0 | 0.2 | 0.3 | 0.2 | 0.5 | — | — |
| Comparative Example | 34 | Remainder | 22 | 5 | 0 | 0.6 | 0.3 | 0 | 1.1 | — | — |
| Comparative Example | 35 | Remainder | 20 | 5 | 0 | 0.2 | 0.2 | 0.1 | 0.6 | — | — |
| Comparative Example | 36 | Remainder | 22 | 4 | 0 | 0.2 | 0.3 | 0.2 | 0.5 | — | — |
| Comparative Example | 37 | Remainder | 21 | 4 | 0 | 0.2 | 0.3 | 0.3 | 0.5 | — | — |
| Comparative Example | 38 | Remainder | 21 | 4 | 0 | 0.2 | 0.3 | 0.3 | 0.5 | — | — |
| Example | 39 | Remainder | 19 | 6 | 0.05 | 0.2 | 0.2 | 0.2 | 0.1 | Pb | 0.03 |
| Example | 40 | Remainder | 22 | 3 | 0.1 | 0.1 | 0.3 | 0.1 | 0.2 | Zr | 0.02 |
| Example | 41 | Remainder | 24 | 3 | 0.1 | 0.2 | 0.2 | 0.2 | 0.3 | W | 0.01 |
| Comparative Example | 42 | Remainder | 21 | 4 | 0 | 0.1 | 0.3 | 0.3 | 0.5 | — | — |
| Comparative Example | 43 | Remainder | 21 | 5 | 0 | 0.2 | 0.3 | 0.3 | 0.5 | — | — |

TABLE 2

| | | Production conditions | | | | |
|---|---|---|---|---|---|---|
| Classification | No. | Strain treatment condition | Presence or absence of pre-Ni plating | Annealing temperature (° C.) | Cooling type from after bath pulling-up to 300° C. | Mist cooling spray amount (L/mm$^2$/min) from after bath pulling-up to 300° C. |
| Example | 1 | A | Present | 580 | Mist cooling | 1.0 |
| Example | 2 | A | Present | 580 | Mist cooling | 4.0 |
| Example | 3 | A | Present | 580 | Mist cooling | 15 |
| Example | 4 | A | Present | 580 | Mist cooling | 15 |
| Example | 5 | A | Present | 580 | Mist cooling | 16 |
| Example | 6 | A | Present | 580 | Mist cooling | 15 |
| Example | 7 | A | Present | 580 | Mist cooling | 20 |
| Example | 8 | A | Present | 580 | Mist cooling | 20 |
| Example | 9 | A | Present | 580 | Mist cooling | 30 |
| Example | 10 | A | Present | 580 | Mist cooling | 30 |
| Example | 11 | A | Present | 580 | Mist cooling | 30 |
| Example | 12 | A | Present | 580 | Mist cooling | 20 |
| Example | 13 | A | Present | 580 | Mist cooling | 20 |
| Example | 14 | A | Present | 580 | Mist cooling | 20 |
| Example | 15 | A | Present | 580 | Mist cooling | 20 |
| Example | 16 | A | Present | 580 | Mist cooling | 30 |
| Example | 17 | A | Present | 580 | Mist cooling | 30 |
| Example | 18 | A | Present | 580 | Mist cooling | 30 |
| Example | 19 | A | Present | 580 | Mist cooling | 30 |
| Example | 20 | A | Present | 580 | Mist cooling | 30 |
| Example | 21 | A | Present | 580 | Mist cooling | 30 |
| Example | 22 | A | Present | 580 | Mist cooling | 30 |
| Example | 23 | A | Present | 580 | Mist cooling | 20 |
| Example | 24 | A | Present | 580 | Mist cooling | 20 |
| Example | 25 | A | Present | 580 | Mist cooling | 20 |
| Comparative Example | 26 | A | Present | 580 | Mist cooling | 15 |
| Comparative Example | 27 | A | Present | 580 | Mist cooling | 15 |
| Comparative Example | 28 | A | Present | 580 | Mist cooling | 15 |

TABLE 2-continued

| Classification | No. | Strain treatment condition | Presence or absence of pre-Ni plating | Annealing temperature (° C.) | Cooling type from after bath pulling-up to 300° C. | Mist cooling spray amount (L/mm²/min) from after bath pulling-up to 300° C. |
|---|---|---|---|---|---|---|
| Comparative Example | 29 | A | Present | 580 | Mist cooling | 15 |
| Comparative Example | 30 | A | Present | 580 | Mist cooling | 15 |
| Comparative Example | 31 | A | Present | 580 | Mist cooling | 15 |
| Comparative Example | 32 | A | Present | 580 | Mist cooling | 15 |
| Comparative Example | 33 | A | Present | 580 | — | — |
| Comparative Example | 34 | A | Absent | 580 | Mist cooling | 15 |
| Comparative Example | 35 | A | Present | 580 | Mist cooling | 0.7 |
| Comparative Example | 36 | A | Present | 580 | Mist cooling | 32 |
| Comparative Example | 37 | A | Present | 620 | Mist cooling | 15 |
| Comparative Example | 38 | A | Present | 800 | Mist cooling | 15 |
| Example | 39 | A | Present | 500 | Mist cooling | 20 |
| Example | 40 | A | Present | 590 | Mist cooling | 30 |
| Example | 41 | AA | Present | 580 | Mist cooling | 30 |
| Comparative Example | 42 | A | Present | 600 | Mist cooling | 15 |
| Comparative Example | 43 | B | Present | 580 | Mist cooling | 15 |

TABLE 3

| | | Microstructure of plated layer | | | Performance | |
|---|---|---|---|---|---|---|
| Classification | No. | $MgZn_2$ phase $I(100)/(I(002)+I(101))$ | α phase $I(111)/I(200)$ | $Mg_2Sn$ phase Presence or absence | Planar corrosion resistance | Sacrificial corrosion resistance |
| Example | 1 | 0.5 | 0.8 | Absent | A | A |
| Example | 2 | 0.9 | 0.4 | Present | A | AA |
| Example | 3 | 1.2 | 3.9 | Present | AA | AA |
| Example | 4 | 1.5 | 4.2 | Absent | AA | AA |
| Example | 5 | 1.0 | 2.2 | Present | AA | AA |
| Example | 6 | 0.9 | 1.1 | Absent | A | A |
| Example | 7 | 0.8 | 1.2 | Present | AA | AA |
| Example | 8 | 1.4 | 2.1 | Present | AA | AA |
| Example | 9 | 1.1 | 2.0 | Present | AA | AA |
| Example | 10 | 1.2 | 2.0 | Present | AA | AA |
| Example | 11 | 1.1 | 2.1 | Present | A | AA |
| Example | 12 | 1.5 | 1.9 | Present | AA | AA |
| Example | 13 | 1.6 | 2.7 | Absent | AA | AA |
| Example | 14 | 2.1 | 2.1 | Present | AA | AA |
| Example | 15 | 1.2 | 2.2 | Present | AA | AA |
| Example | 16 | 0.7 | 1.5 | Present | AA | AA |
| Example | 17 | 1.6 | 1.5 | Absent | AA | AA |
| Example | 18 | 1.8 | 1.4 | Absent | AA | AA |
| Example | 19 | 2.5 | 0.8 | Present | AA | AA |
| Example | 20 | 2.4 | 0.2 | Present | AA | AA |
| Example | 21 | 2.4 | 0.8 | Absent | AA | A |
| Example | 22 | 1.1 | 2.5 | Present | AA | AA |
| Example | 23 | 1.2 | 2.4 | Present | AA | AA |
| Example | 24 | 1.4 | 2.7 | Present | AA | AA |
| Example | 25 | 1.1 | 2.2 | Present | AA | A |
| Comparative Example | 26 | 0.5 | 2.1 | Absent | B | A |
| Comparative Example | 27 | 1.2 | 4.1 | Absent | AA | B |
| Comparative Example | 28 | 0.5 | 2.5 | Absent | B | B |
| Comparative Example | 29 | 1.2 | 2.5 | Absent | B | A |
| Comparative Example | 30 | 1.2 | 2.6 | Absent | B | B |
| Comparative Example | 31 | 1.3 | 1.8 | Absent | B | B |
| Comparative Example | 32 | 1.2 | 2.5 | Absent | B | B |

TABLE 3-continued

| | | Microstructure of plated layer | | | Performance | |
|---|---|---|---|---|---|---|
| Classification | No. | MgZn$_2$ phase I(100)/(I(002) + I(101)) | α phase I(111)/I(200) | Mg$_2$Sn phase Presence or absence | Planar corrosion resistance | Sacrificial corrosion resistance |
| Comparative Example | 33 | 0.3 | 6.4 | Absent | B | B |
| Comparative Example | 34 | 0.1 | 7.3 | Absent | B | B |
| Comparative Example | 35 | 0.4 | 5.5 | Absent | B | B |
| Comparative Example | 36 | No evaluation due to occurrence of appearance defect | | | | |
| Comparative Example | 37 | 0.4 | 6.4 | Absent | B | B |
| Comparative Example | 38 | 0.2 | 6 | Absent | B | B |
| Example | 39 | 1.5 | 1.9 | Present | AA | AA |
| Example | 40 | 2.5 | 0.8 | Present | AA | AA |
| Example | 41 | 2.4 | 0.2 | Present | AA | AA |
| Comparative Example | 42 | 0.4 | 6.5 | Absent | B | B |
| Comparative Example | 43 | 0.2 | 6 | Absent | B | B |

FIELD OF INDUSTRIAL APPLICATION

The above aspect of the present invention is excellent in both planar corrosion resistance and sacrificial corrosion resistance and high in industrial applicability.

What is claimed is:

1. A hot-dip plated steel material comprising:
a steel material; and
a hot-dip plated layer disposed on a surface of the steel material,
wherein the hot-dip plated layer has a chemical composition containing, in terms of mass %,
Al: 10.0 to 30.0%,
Mg: 3.0 to 15.0%,
Fe: 0.01 to 15.0%,
Si: 0 to 10.0%,
Ni: 0 to 1.0%, and
Ca: 0 to 4.0%, and
further containing one or two or more elements selected from the element group consisting of Sb: 0 to 0.5%, Pb: 0 to 0.5%, Cu: 0 to 1.0%, Sn: 0 to 2.0%, Ti: 0 to 1.0%, Cr: 0 to 1.0%, Nb: 0 to 1.0%, Zr: 0 to 1.0%, Mn: 0 to 1.0%, Mo: 0 to 1.0%, Ag: 0 to 1.0%, Li: 0 to 1.0%, La: 0 to 0.5%, Ce: 0 to 0.5%, B: 0 to 0.5%, Y: 0 to 0.5%, P: 0 to 0.5%, Sr: 0 to 0.5%, Co: 0 to 0.5%, Bi: 0 to 0.5%, In: 0 to 0.5%, V: 0 to 0.5%, and W: 0 to 0.5%, in an amount of 5% or less in total, and
the remainder: Zn and an impurity, and
the hot-dip plated layer has a diffraction intensity obtained from a result of X-ray diffraction measurement, the diffraction intensity satisfying a relationship of the following formulas (1a) and (2a):

$$0.5 \leq I(100)_{MgZn2}/\{I(002)_{MgZn2}+I(101)_{MgZn2}\} \leq 2.5 \quad (1a)$$

$$0.2 \leq I(111)_\alpha/I(200)_\alpha \leq 5.0 \quad (2a)$$

wherein, in the formula (1a), $I(100)_{MgZn2}$ represents an MgZn$_2$ phase (100)diffraction intensity, $I(002)_{MgZn2}$ represents an MgZn$_2$ phase (002)diffraction intensity, and $I(101)_{MgZn2}$ represents an MgZn$_2$ phase (101)diffraction intensity, and in the formula (2a), $I(111)_\alpha$ represents an α phase (111)diffraction intensity and $I(200)_\alpha$ represents an α phase (200)diffraction intensity.

2. The hot-dip plated steel material according to claim 1, wherein the chemical composition of the hot-dip plated layer contains Sn: 0.05 to 0.5% in terms of mass %, and the hot-dip plated layer has a result of X-ray diffraction measurement that an Mg$_2$Sn phase is detected.

3. A hot-dip plated steel material comprising:
a steel material; and
a hot-dip plated layer disposed on a surface of the steel material,
wherein the hot-dip plated layer has a chemical composition containing, in terms of mass %,
Al: 15.0 to 30.0%,
Mg: 5.0 to 10.0%,
Fe: 0.01 to 15.0%,
Si: 0 to 10.0%,
Ni: 0 to 1.0%, and
Ca: 0 to 4.0%, and
further containing one or two or more elements selected from the element group consisting of Sb: 0 to 0.5%, Pb: 0 to 0.5%, Cu: 0 to 1.0%, Sn: 0 to 2.0%, Ti: 0 to 1.0%, Cr: 0 to 1.0%, Nb: 0 to 1.0%, Zr: 0 to 1.0%, Mn: 0 to 1.0%, Mo: 0 to 1.0%, Ag: 0 to 1.0%, Li: 0 to 1.0%, La: 0 to 0.5%, Ce: 0 to 0.5%, B: 0 to 0.5%, Y: 0 to 0.5%, P: 0 to 0.5%, Sr: 0 to 0.5%, Co: 0 to 0.5%, Bi: 0 to 0.5%, In: 0 to 0.5%, V: 0 to 0.5%, and W: 0 to 0.5%, in an amount of 5% or less in total, and
the remainder: Zn and an impurity, and
the hot-dip plated layer has a diffraction intensity obtained from a result of X-ray diffraction measurement, the diffraction intensity satisfying a relationship of the following formulas (1b) and (2b):

$$1.0 \leq I(100)_{MgZn2}/\{I(002)_{MgZn2}+I(101)_{MgZn2}\} \leq 2.0 \quad (1b)$$

$$0.2 \leq I(111)_\alpha/I(200)_\alpha \leq 5.0 \quad (2b)$$

wherein, in the formula (1b), $I(100)_{MgZn2}$ represents an MgZn$_2$ phase (100)diffraction intensity, $I(002)_{MgZn2}$ represents an MgZn$_2$ phase (002)diffraction intensity, and $I(101)_{MgZn2}$ represents an MgZn$_2$ phase (101)diffraction intensity, and in the formula (2b), $I(111)_\alpha$ represents an α phase (111)diffraction intensity and $I(200)_\alpha$ represents an α phase (200)diffraction intensity.

4. The hot-dip plated steel material according to claim 3, wherein the chemical composition of the hot-dip plated layer contains Sn: 0.05 to 0.5% in terms of mass %, and the hot-dip plated layer has a result of X-ray diffraction measurement that an Mg$_2$Sn phase is detected.

* * * * *